July 28, 1964 T. GONDA 3,142,808
TRANSMISSION LINE FILTER HAVING COUPLING EXTENDING
QUARTER WAVE LENGTH BETWEEN STRIP LINE RESONATORS
Filed Dec. 29, 1960 2 Sheets-Sheet 1

INVENTOR
TIBOR GONDA

BY Stephen J. Limanek
ATTORNEY

United States Patent Office 3,142,808

Patented July 28, 1964

3,142,808

TRANSMISSION LINE FILTER HAVING COUPLING EXTENDING QUARTER WAVE LENGTH BETWEEN STRIP LINE RESONATORS

Tibor Gonda, New York, N.Y., assignor to International Business Machines Corporation, New York, N.Y., a corporation of New York Filed Dec. 29, 1960, Ser. No. 79,311
7 Claims. (Cl. 333—73)

Figure 1:
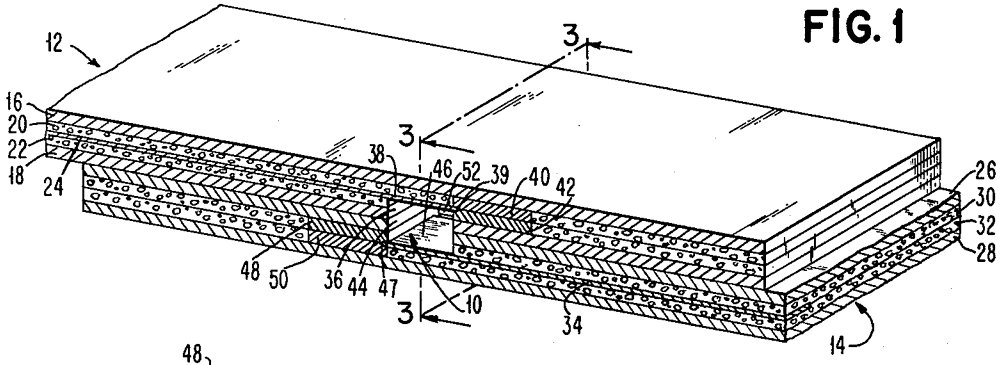

This invention relates to transmission line couplers and more particularly to filter couplers for intercoupling strip transmission lines in adjacent planes of a stacked array of planes.

The term "strip transmission line" or "strip line" is herein used to designate an electric circuit or line having at least one ground plate and a strip of thin, conductive metal or foil spaced from the ground plate by a layer of dielectric material. One form of the strip line comprises a sandwich-type transmission line having two metallic ground plates in spaced parallel relationship to each other with a dielectric material, having a dielectric constant equal to preferably unity, filling the space between the plates. Supported by the dielectric material between the plates is a strip of thin conductive metal or foil spaced an equal distance to each of the ground plates. The field associated with the strip transmission lines is confined rather closely to the two regions directly between the strip of thin conductive metal or foil, commonly called the center conductor of the strip transmission line, and the two ground plates. Accordingly, a large lateral separation need not be provided between center conductors in the same transmission line circuit plane, thus large and complex composite miniature circuits may be contained in one circuit plane between a single pair of ground plates. A modified form of strip transmission line, commonly called microstrip, utilizes a single ground plate and a center conductor spaced from the ground plate by a suitable dielectric material. When the physical size of a single strip transmission line circuit plane becomes inconveniently large or unwieldly, the circuit may be divided into sections which may be stacked to form a plurality of planes disposed in a compact arrangement providing a three dimensional package.

In the divided or stacked arrangement or array, it is, of course, necessary to have means for electrically interconnecting circuit points lying in different planes. Couplers for electrically connecting circuit points lying in different planes which utilize a waveguide passing through one or more planes have been described in detail in my U.S. patent application, entitled "Transmission Line Coupler," having Serial No. 74,724, filed December 8, 1960. However, in order to avoid interference due to near field effects, this type of coupler is generally not desirable for interconnecting circuit points spaced apart by a distance of less than ½ the wave length of the propagating signal, which is generally the case when circuit points lying in adjacent stacked planes are interconnected. A coupler which has been found suitable for interconnecting circuit points in adjacent planes utilizes a modified coaxial arrangement which mechanically connects the center conductor of the coaxial line to the desired center conductor in each of the adjacent planes, the outer conductor of the coaxial line being connected to the ground plates of these adjacent planes.

The waveguide coupler arrangement can be conveniently divided into waveguide sections having a length equal to the thickness of a strip transmission line circuit plane so that any desired circuit plane of a stacked array may be withdrawn from the stack of planes and readily replaced without disturbing the other planes in the stack, as described more fully in my above mentioned application.

However, when the modified coaxial line coupler is used to interconnect circuit points lying in two stacked adjacent planes, one of these circuit planes cannot be readily removed from the stack without disturbing the other of the two circuit planes in the stack due to the required mechanical connections between the coaxial line and the circuit planes.

Accordingly, it is an object of this invention to provide an improved coupler for intercoupling circuit points in adjacent stacked strip transmission circuit planes.

Another object of this invention is to provide a strip transmission line coupler for interconnecting adjacent stacked circuit planes which does not require the use of mechanical connections between the planes.

Still another object of the present invention is to provide an improved coupler which electromagnetically intercouples adjacent strip transmission lines.

Yet another object of this invention is to provide an improved strip transmission line coupler based on quarter wave strip transmission line coupled filter properties.

A further object of this invention is to provide an improved adjacent plane coupler which is simple and economical.

In accordance with this invention, a coupler is provided for interconnecting two adjacent stacked strip transmission circuit planes which utilizes a filter section in each of the two adjacent planes. The filter sections are aligned with respect to each other without the interposition of a ground plate, one end of one of the aligned filter sections is short circuited to a ground plate of its circuit plane and the opposite end of the other filter section is short circuited to a ground plate of its circuit plane.

An advantage of the coupler of this invention is that any desired plane of a stack array of planes may be removed from the array and reinserted into the array without disturbing the other planes of the array.

Another advantage of the filter coupler of this invention is that this filter coupler may be conveniently, simply and economically made from the same thin metal or foil used to make the center conductors of the strip transmission line of the circuit plane and by utilizing the same photo etching techniques employed in constructing the center conductors.

The foregoing and other objects, features and advantages of the invention will be apparent from the following more particular description of preferred embodiments of the invention, as illustrated in the accompanying drawings.

Figure 4:
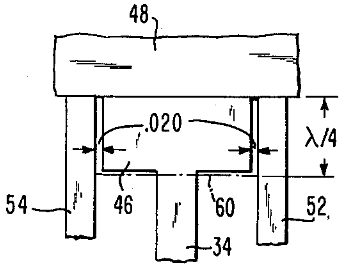
Figure 3:
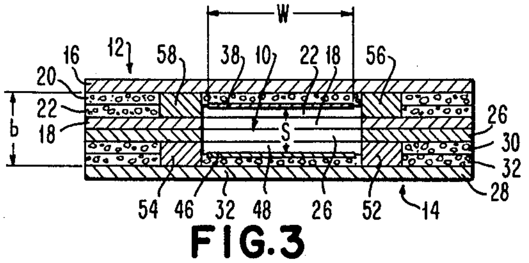
Figure 5:
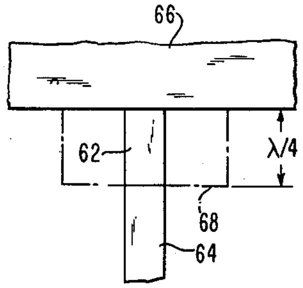
Figure 6:
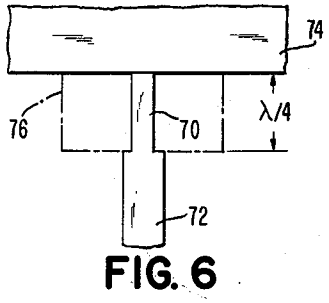
Figure 7:
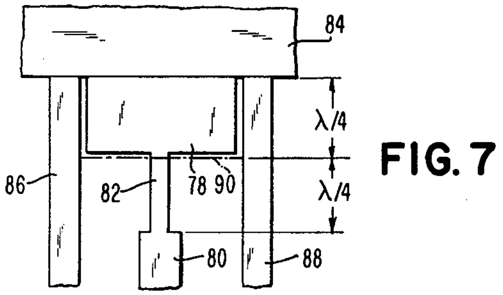
Figure 2:
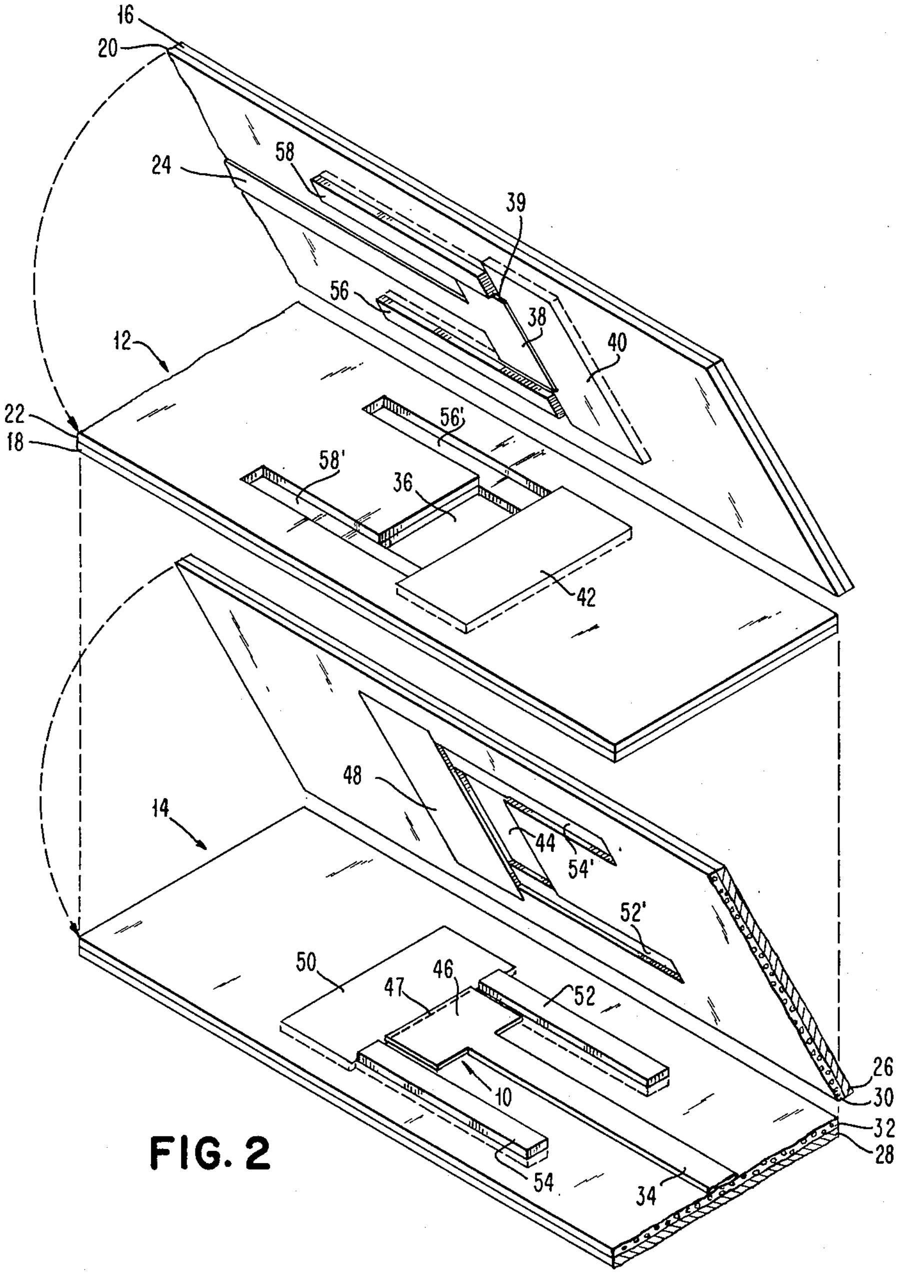

In the drawings:

FIG. 1 illustrates a fragmentary perspective view of a coupler of the present invention interconnecting two adjacent stacked circuit planes, FIG. 2 is an exploded and open perspective view of the entire coupler of the present invention shown interconnecting the two adjacent circuit planes illustrated partially in FIG. 1, FIG. 3 is a cross-sectional view of the coupler shown in FIGS. 1 and 2 taken through plane 3—3—3 of FIG. 1, FIG. 4 is a plan view of the filter section and the associated short circuiting members of the coupler shown in FIGS. 1, 2 and 3, FIGS. 5 and 6 illustrate modifications of the filter section shown in FIG. 4 and FIG. 7 shows a filter section of the coupler of this invention connected to a strip transmission line through an impedance transformer.

Referring to the drawings in more detail wherein like reference numerals in the various figures refer to similar elements, FIG. 1 illustrates a fragmentary perspective view through a coupler 10 of the present invention shown interconnecting a first circuit plane 12 positioned on a second circuit plane 14. The first circuit plane 12 includes an upper ground plate 16 and a lower ground plate 18, an upper layer of dielectric material 20 and a lower layer of dielectric material 22. Disposed between the upper and lower layers of dielectric material 20 and 22 is a center conductor 24 forming a portion of a strip transmission line in the first circuit plane 12. The lower circuit plane 14 includes an upper ground plate 26 and a lower ground plate 28, an upper layer of dielectric material 30 and a lower layer of dielectric material 32. Disposed between the upper and lower layers of dielectric material 30 and 32 is a center conductor 34 forming a portion of a strip transmission line in the second circuit plane 14. The layers of dielectric material 20, 22, 30 and 32 are preferably made of a solid dielectric foam as described in a commonly assigned application having Serial No. 824,003, filed June 30, 1959, by George F. Bland now abandoned.

The lower ground plate 18 of the first circuit plane 12 has a portion thereof removed to form an opening 36 therein at the end of the center conductor 24. The length of the opening 36 along the longitudinal direction of the conductor 24 is equal to at least ¼ of the wave length of the propagating wave, i.e., the signal desired to be transferred between the center conductor 24 in the upper circuit plane 12 and the center conductor 34 in the lower circuit plane 14. The width of the opening 36 has a minimum given dimension which will be determined hereinbelow. Disposed above the opening 36 and in a co-planar relationship with the center conductor 24 is a filter section 38 made of thin conductive metal or foil having a length which is an odd multiple of a quarter wave length of the signal to be transmitted between the two circuit planes 12, 14 and a width which will be calculated hereinbelow. The width of the opening 36 in the lower ground plate 18 is made equal to at least the width of the filter section 38. One end of the filter section 38 is coupled, and preferably integrally, to the center conductor 24 and the opposite end of the filter section 38 has an extension 39 secured between upper and lower filter section ground plates or bars 40 and 42, each of which have one end aligned with the edge of the lower ground plate 18 at the opening 36. The upper and lower filter section ground plates 40 and 42 have similar thicknesses and their combined thickness is equal to the perpendicular distance between the upper and lower ground plates 16 and 18 so as to firmly secure the thin foil of the extension 39 of the filter section 38 between the filter section ground plates 40 and 42 to provide a ground connection to the upper and lower ground plates 16 and 18.

The upper ground plate 26 has a portion thereof removed to form an opening 44 therein at the end of the center conductor 34. The size of the opening 44 is equal to the size of the opening 36 in the lower ground plate 18 of the first circuit plane 12. Disposed below the opening 44 and in a co-planar relationship with the center conductor 34 is a filter section 46 having dimensions similar to the dimensions of the filter section 38 in the first circuit plane 12. One end of the filter section 46 is coupled, and preferably integrally, to the center conductor 34 and the opposite end of the filter section 46 has an extension 47 secured between upper and lower filter section ground plates 48 and 50, each of which have one end aligned with the edge of the upper ground plate 26 of the lower circuit plane 10 at the opening 44. The upper and lower filter section ground plates 48 and 50 have similar thicknesses and their combined thickness is equal to the perpendicular distance between the upper and lower ground plates 26 and 28 of the lower circuit plane 14 to securely ground one end of the filter section 46 to the ground plates 26 and 28 in the manner described hereinabove in connection with the grounding of the filter section 38 in the first circuit plane 12.

The filter section 38 and the opening 36 in the lower ground plate 18 of the upper circuit plane 12 are aligned with the filter section 46 and the opening 44 in the upper ground plate of the lower circuit plane 14, respectively, and the portions of the layers of dielectric material 22 and 30 aligned with the openings 36 and 44 are preferably removed to form a continuous air column between the two filter sections 38 and 46. The two grounded ends of the filter sections 38 and 46 are located at two diagonally opposite corners of the air column and the two coupler terminals or junctions between the filter sections 38, 46 and the center conductors 24 and 34 are located at two other diagonally opposite corners of the air column. A first electrical shorting bar 52, provided to serve as a magnetic wall between closely spaced co-planar circuits, is disposed along one of the sides of the filter section 46 and spaced a short distance therefrom. The electrical shorting bar 52 has a thickness equal to the distance between the upper and lower ground plates 26 and 28 of the lower circuit plane 14 and one end thereof is shown abutting the lower filter section ground plate 50.

FIG. 2 is an exploded and open perspective view showing the coupler 10 in the two circuit planes 12 and 14. FIG. 2 illustrates all of the elements shown in FIG. 1 and additionally shows a second electrical shorting bar 54 similar to the first shorting bar 52 disposed along the other side of the filter section 46 in the second circuit plane 14 and spaced a short distance therefrom. The second shorting bar 54 also has one end thereof abutting the lower filter section ground plate 50. The upper layer of the dielectric material 30 in the lower circuit plane 14 is shown provided with first and second recesses 52' and 54' for receiving the upper halves of the first and second shorting bars 52 and 54, respectively, the lower halves of the first and second shorting bars 52 and 54 being disposed in recesses in the lower layer of dielectric material 32. In the upper circuit plane 12 there is shown in FIG. 2 a first electrical shorting bar 56 which is similar to the shorting bars 52 and 54 in the lower circuit plane 14, disposed along one of the sides of the filter section 38 and spaced a short distance therefrom. The first shorting bar 56 of the upper circuit plane 12 has one end thereof abutting the upper filter section ground plate 40 in the upper circuit plane 12. A second electrical shorting bar 58 similar to the shorting bars 52, 54 and 56 is disposed along the other side of the filter section 38, is spaced a short distance therefrom and also has one end abutting the upper filter section ground plate 40. In FIG. 2 the lower layer of dielectric material 22 of the upper circuit plane 12 is shown provided with a first recess 56' and a second recess 58' for receiving the lower half of the first and second shorting bars 56 and 58, respectively, the upper halves of the first and second shorting bars 56 and 58 being disposed in recesses in the upper layer of the dielectric material 20. It can be readily seen that when the elements illustrated in FIG. 2 are assembled the shorting bars 52, 54, 56 and 58 will be inserted into their respective recesses 52', 54', 56' and 58' to form short circuits along each of the sides of each of the two filter sections 38 and 46 and the upper and lower filter section ground plates 40 and 42 and 48 and 50 in the two circuit planes 12, 14 will be aligned with respect to each other to form a support and a short circuit for one end of each of the filter sections 38 and 46.

FIG. 3 is a transverse cross-sectional view of the entire coupler taken through the upper and lower circuit planes 12 and 14 at the plane 3—3—3 in FIG. 1 of the drawing. FIG. 3 shows the spacing between the upper filter section 38 and the lower filter section 46 to be equal to the distance $s$, the spacing between the upper ground plate 16 of the upper circuit plane 12 and the lower ground plate 28 of the lower circuit plane 14 to be equal to the distance $b$ and the width of each of the two filter sections 38 and 46 to be equal to $w$.

FIG. 4 is a plan view illustrating more clearly the relationship between the filter sections and the filter section ground plates and the shorting bars. FIG. 4 shows the upper filter section ground plate 48 covering the extension 47 of the filter section 46, thus placing an edge of the filter section 46 in contact with the upper filter section ground plate 48 while each of the sides of the filter section 46 are separated from the first and second shorting bars 52 and 54, respectively, by a distance equal to 0.020 inch. The end of center conductor 34 is shown connected to the edge of the filter section 46 which is opposite the grounded edge thereof and which is one of the two terminals of the filter coupler 10. FIG. 4 also indicates the area of the opening 44 in the upper ground plate 26. This opening 44 is equal to the area defined by the lower filter section ground plate 50, the first and second shorting bars 52 and 54 and the dashed line 60 which enclose the filter section 46.

In the operation of the circuit of the present invention a signal to be transmitted between a strip transmission line including center conductor 24 in the first circuit plane 12 and a strip transmission line including center conductor 34 in the second circuit plane 14 may pass through the filter coupler 10 in either direction. One of the filter sections 38, 46 produces an electromagnetic field which couples into the output circuit of the coupler through the other of the filter sections 38, 46. In order to design the filter so that reflections are not produced at its junction with a transmission line or circuit the image impedance thereof viewed from each of its two terminals of the coupler should be equal to the characteristic impedance $Z_0$ of each of the lines to which it is to be connected. The image impedance may be calculated from the formula $$Z_I=\frac{2Z_{0e}Z_{0o}\sin\theta}{[(Z_{0e}-Z_{0o})^2-(Z_{0e}+Z_{0o})^2\cos^2\theta]^{1/2}}$$

where $\theta$ is equal to the electrical length of a filter section, $Z_{0o}$ is equal to the odd impedance which is the characteristic impedance of the center conductor to the ground plate with equal currents in the center conductor and the ground plate flowing in opposite directions and $Z_{0e}$ is the even impedance which is the characteristic impedance of the center conductor to the ground plate with equal currents flowing in the center conductor and the ground plate in the same direction. For the strip line cross-section shown in FIG. 3 of the drawing, $$Z_{0o}=\frac{188.3/\sqrt{\epsilon_r}}{\frac{w/b}{1-s/b}+\frac{w}{s}+\frac{C_{fo}}{\epsilon_r}}$$

and $$Z_{0e}=\frac{188.3/\sqrt{\epsilon_r}}{\frac{w/b}{1-s/b}+\frac{C_{fe}}{\epsilon_r}}$$

where $\epsilon_r$ is equal to the relative dielectric constant and $C_{fo}$ and $C_{fe}$ are the fringing capacitances respectively for the odd and even modes.

Although the distance *s* between the filter sections or center conductors and the distance *b* between the ground plates may be varied, it is customary in the industry to set these distances at a fixed standard value, *s* being equal to .212 inch and *b* being equal to .332 inch and the dielectric constant of the dielectric material is preferably equal to unity. Accordingly, the only available variable in the above stated equations is the width *w*. Since the geometry of strip transmission line structure fixes all the parameters except the width *w*, it has been found that the image impedance $Z_I$ cannot be always made equal to $Z_0$. The undesirability of producing unwanted modes in the strip transmission circuits sets the upper limit for *w* to approximately 500 mils and the lower limit of the width *w* is determined by manufacturing techniques.

The filter sections 38 and 46 may be directly coupled to the center conductors 24 and 34, respectively, as shown in FIGS. 1 and 3 if the image impedance $Z_I$ of the filter coupler 10 is not appreciably different from the characteristic impedance $Z_0$ of each of the strip transmission lines including the center conductors 24 and 34.

If the distances *s* and *b* may be varied and the image impedance $Z_I$ of the filter coupler is equal to the characteristic impedance $Z_0$ of the strip transmission line to which it is connected, the width *w* of the filter section may be made equal to the width of the center conductor of the transmission line, as indicated in FIG. 5 of the drawing. FIG. 5 shows a filter section 62 having a length equal to a quarter wave length connected at one end to a transmission line having a center conductor 64 and at the opposite end to a shorting plate 66. The filter section 62 may be simply a quarter wave length of the center conductor 64. The minimum opening in the ground plates which may be disposed between a pair of the filter sections 62 in adjacent circuit planes is indicated by the rectangle 68.

For certain values of *s* and *b* the image impedance $Z_I$ of the coupler of the present invention may be equal to the characteristic impedance $Z_0$ of the line to which it is directly connected when the width *w* of the filter section is less than the width of the center conductor of the strip transmission line, as indicated in FIG. 6 of the drawing. FIG. 6 shows a filter section 70 having a wave length $\lambda/4$ of the propagating wave connected at one end to the center conductor 72 of a strip transmission line and the other end connected to a grounding plate 74. The width of the filter section 70 can be seen to be less than the width of the center conductor 72. The minimum opening in a ground plate which may be interposed between a pair of the filter sections 70 lying in two adjacent planes is indicated by the rectangle 76. When the width *w* of the filter section is equal to or less than the width of the center conductor of the strip transmission line to which it is connected, shorting bars need not be provided along the sides of the filter section.

For operation in the microwave region at the X-band and more particularly at a center frequency of 9 kmc. with the commonly used strip transmission line structure having a ground plate spacing *b* equal to .332 inch and a center strip spacing *s* equal to .212 inch and a center conductor width equal to the conventionally used 152 mils, the image impedance of the filter coupler may be calculated to be 687 ohms. In order to lower this high impedance, the width of the thin foil or strip in the filter section is widened to the maximum permissible width of approximately 500 mils. The image impedance of the filter coupler at the 500 mil width is 165 ohms, although the characteristic impedance of the isolated strip or center conductor having a width 500 mils is only 18 ohms. The physical width of the strip can be made slightly smaller by placing the electrical shorting walls close to the sides of the filter. Since a standard strip transmission line has a characteristic impedance of 50 ohms, a quarter wave impedance transformer, having an impedance of 90 ohms must be interposed between the 50 ohm strip transmission line and this 165 ohm filter coupler if a reflectionless connection is required. The arrangement utilizing an impedance transformer is illustrated in FIG. 7 of the drawing wherein a 500 mil wide filter section 78 is shown coupled to a 152 mil wide center conductor 80 through a 59 mil wide impedance transformer 82. The grounded edge of the filter section 78 is connected to a grounding plate 84 and first and second shorting bars 86 and 88 are disposed along the sides of the filter section 78. The required minimum ground plate opening for filter section 78 is equal to the area defined by the grounding plate 84, first and second shorting bars 86 and 88 and the dashed line 90. A filter coupler of the present invention having the filter section and transformer arrangement shown in FIG. 7 was built and tested to have a coupling factor greater than —1 db for a 1 kmc. bandwidth.

Accordingly, it can be seen that a simple, economical and highly efficient filter coupler has been provided for intercoupling adjacent stacked strip transmission line circuit planes without the use of mechanical connections between the intercoupled planes.

While the invention has been particularly shown and described with reference to preferred embodiments thereof, it will be understood by those skilled in the art that various changes in form and details may be made therein without departing from the spirit and scope of the invention.

What is claimed is:

1. A strip transmission line coupler for a propagating wave having a given wave length comprising a first strip transmission circuit plane having first and second spaced apart ground plates, a filter section disposed midway between said ground plates and means for short circuiting one edge of said filter section, the opposite edge of said filter section being coupled to a transmission line and a second strip transmission circuit plane positioned in stacked array with said first strip transmission circuit plane, said second circuit plane including first and second spaced apart ground plates, a filter section disposed midway between the first and second ground plates of said second circuit plane and means for short circuiting one edge of the filter section of said second circuit plane, the opposite edge of the filter section of said second plane being coupled to a transmission line in said second circuit plane, the filter sections in said first and second circuit planes being aligned with respect to each other and having a length in the direction of wave propagation equal to an odd multiple of a quarter of the wavelength of the propagating wave and each of the ground plates disposed between said filter sections having an opening therein aligned with said filter sections.

2. A strip transmission line coupler for a propagating wave having a given wave length comprising first and second adjacent strip transmission circuit planes positioned in a stacked array, said first circuit plane including a ground plate and a filter section spaced from said ground plate, means for connecting one edge of said filter section to said ground plate, means for connecting the opposite edge of said filter section to a strip transmission line in said first circuit plane, said second circuit plane including a ground plate and a filter section spaced from the ground plate of said second circuit plane, and means for connecting one edge of said filter section to the ground plate of said second circuit plane, means for connecting the opposite edge of said filter section to a strip transmission line in said second circuit plane, said filter sections being spaced apart and disposed in aligned relationship with respect to each other and interposed between said ground plates and having a length in the direction of wave propagation equal to an odd multiple of a quarter of the wavelength of the propagating wave.

3. A strip transmission line coupler for a propagating wave having a given wavelength comprising first and second adjacent strip transmission circuit planes positioned in stacked array, each of said circuit planes including first and second parallel ground plates spaced from each other, each of said circuit planes further including a filter section disposed between first and second ground plates and means for coupling one edge of said filter section to said ground plates, the opposite edge of said filter section forming a terminal of said coupler, said filter sections being aligned with each other and having a length in the direction of wave propagation equal to an odd multiple of a quarter of the wavelength of the propagating wave and each of the ground plates disposed between said filter sections having an opening formed around said filter sections.

4. A strip transmission circuit plane coupler for a propagating wave having a given wavelength comprising first and second strip transmission circuit planes disposed in stacked array, each of said planes including a ground plate and a filter section spaced from its associated plate and means for coupling one end of each filter section to its associated ground plate, the opposite end of each filter section forming a terminal of the coupler, said filter sections being spaced apart and aligned with respect to each other so that a grounded end of one of said filter sections is positioned directly above the opposite end of the other of said filter sections and having a length in the direction of propagation equal to an odd multiple of a quarter of the wavelength of the propagating wave.

5. A strip transmission line coupler for a propagating wave of a given wavelength comprising a first strip transmission circuit plane having first and second spaced apart ground plates, a filter section disposed midway between said ground plates, means for short circuiting one edge of said filter section, the opposite edge of said filter section forming a terminal of said coupler, and means for providing a short circuit between said first and second ground plates in the vicinity of and along each of the sides of said filter, and a second strip transmission circuit plane positioned in stacked array with said first strip transmission circuit plane, said second circuit plane including first and second spaced apart plates, a filter section disposed midway between the first and second ground plates of said second circuit plane, means for short circuiting one edge of the filter section of said second circuit plane, the opposite edge of said filter section forming a terminal of said coupler, and means for providing a short circuit between the first and second ground plates of said second ground plane in the vicinity of and along each of the sides of said filter section, the filter sections in said first and second circuit planes being aligned with respect to each other and having a length in the direction of propagation equal to an odd multiple of a quarter of the wavelength of the propagating wave and the ground plates disposed between said filter sections having aligned openings therein between said filter sections.

6. An electrical coupler for a propagating wave having a given wavelength comprising a first conductive plate, a first thin conductive strip having a length equal to an odd multiple of quarter wave lengths of said wave, said strip being disposed in spaced apart parallel relationship with respect to said plate and being connected at one edge thereof to said plate, the opposite edge of said first strip forming a first terminal of said coupler, a second conductive plate and a second thin conductive strip having a length equal to the length of said first strip, said second strip being disposed in spaced apart parallel relationship with respect to said second plate and being connected at one edge thereof to said second plate, the opposite edge of said second strip forming a second terminal of said coupler, said first and second strips being aligned and disposed in spaced apart parallel relationship to each other and the one edge of said first and second strips being disposed on opposite sides of said aligned strips.

7. An electrical coupler for a propagating wave having a given wavelength comprising a first strip transmission line having a ground plate and a center conductor terminated in a ground connection to said plate and a second strip transmission line having a ground plate and a center conductor terminated in a ground connection to said plate, the surfaces of each of said center conductors removed from their respective ground plates being spaced apart in parallel alignment and disposed opposite to each other, each of said center conductors extending at least from its grounded end to a point thereon directly opposite to the grounded end of the other center conductor, the distance measured along one of the center conductors between the grounded end and said point being equal to an odd multiple of a quarter of the wave length of the propagating wave.

References Cited in the file of this patent

UNITED STATES PATENTS

| | | |
|---|---|---|
| 2,402,540 | Espley | June 25, 1946 |
| 2,755,447 | Engelmann | July 17, 1956 |

OTHER REFERENCES

Griffen: Abstract of application Serial Number 658,941, published Nov. 13, 1951, O.G., vol. 652, page 616.

Bland et al.: "IBM Technical Disclosure Bulletin," vol. 3, No. 4, September 1960, pages 22 and 23.

T. Gonda: Transmission Line Couplers, IBM Technical Disclosure Bulletin, vol. 4, No. 12, May 1962, pages 49–50.